(12) United States Patent
Fournier et al.

(10) Patent No.: US 8,487,785 B2
(45) Date of Patent: Jul. 16, 2013

(54) DEVICE FOR FORMULATING THE ALERTS OF AN AIRCRAFT SYSTEM

(75) Inventors: François Fournier, Roques sur Garonne (FR); Christian Sannino, Toulouse (FR); Stéphanie Gaudan, Toulouse (FR); Laurent Robert, Castelnaudary (FR)

(73) Assignee: Thales, Neuilly sur Seine (FR)

( * ) Notice: Subject to any disclaimer, the term of this patent is extended or adjusted under 35 U.S.C. 154(b) by 98 days.

(21) Appl. No.: 12/963,482

(22) Filed: Dec. 8, 2010

(65) Prior Publication Data

US 2011/0254704 A1   Oct. 20, 2011

(30) Foreign Application Priority Data

Dec. 11, 2009   (FR) ...................................... 09 06005

(51) Int. Cl.
*G08B 21/00* (2006.01)
(52) U.S. Cl.
USPC ............. 340/945; 340/963; 340/961; 434/28; 434/30; 342/169; 342/29
(58) Field of Classification Search
USPC ............. 340/945, 968, 963, 961, 964; 701/3, 701/9; 342/169, 182, 29, 357.31; 702/182, 702/185; 434/30, 28, 29
See application file for complete search history.

(56) References Cited

U.S. PATENT DOCUMENTS

| | | | |
|---|---|---|---|
| 4,959,015 A * | 9/1990 | Rasinski et al. ................... 434/2 |
| 5,549,477 A * | 8/1996 | Tran et al. .......................... 434/5 |
| 6,049,828 A | 4/2000 | Dev et al. |
| 6,114,990 A * | 9/2000 | Bergljung et al. ........ 342/357.31 |
| 6,539,291 B1 * | 3/2003 | Tanaka et al. ...................... 701/9 |
| 7,296,194 B1 * | 11/2007 | Lovy et al. ......................... 714/57 |
| 7,620,537 B2 * | 11/2009 | Johnson et al. .................. 703/22 |
| 2001/0014886 A1 * | 8/2001 | Ross et al. ....................... 706/45 |
| 2003/0004679 A1 * | 1/2003 | Tryon et al. .................... 702/182 |
| 2003/0065428 A1 * | 4/2003 | Mendelson et al. .............. 701/9 |
| 2006/0025908 A1 | 2/2006 | Rachlin |
| 2006/0080077 A1 * | 4/2006 | Johnson et al. .................. 703/22 |
| 2007/0069944 A1 * | 3/2007 | Buell ............................. 342/169 |
| 2007/0103340 A1 * | 5/2007 | Baranov et al. ............... 340/968 |
| 2008/0106437 A1 * | 5/2008 | Zhang et al. ................... 340/945 |
| 2010/0241293 A1 * | 9/2010 | Ganguli et al. ................... 701/4 |
| 2011/0060705 A1 * | 3/2011 | Hender et al. ................... 706/12 |

* cited by examiner

*Primary Examiner* — Hoi Lau

(74) *Attorney, Agent, or Firm* — Baker & Hostetler, LLP

(57) ABSTRACT

A system and device is provided for formulating alerts of the items of equipment of an aircraft. The device includes a database of virtual objects representing the items of equipment for constructing a virtual model representative on the one hand of the topological configuration of the network of items of equipment and on the other hand of the configuration of the chain of functional applications implemented by the items of equipment, means for each virtual object to formulate a request for consulting the status of the functional application carried out by the item of equipment associated with the object and means for detecting alerts for formulating requests for consulting the status of each of the objects of the virtual model so as to detect anomalies of configuration of the topology of the network of items of equipment and of the chain of functional applications of the virtual model and to transmit the alerts associated with the anomalies. The device detects and manages the alerts of an aircraft.

6 Claims, 2 Drawing Sheets

State of the art

State of the art

DEVICE FOR FORMULATING THE ALERTS OF AN AIRCRAFT SYSTEM

CROSS-REFERENCE TO RELATED APPLICATION

This application claims priority to foreign French patent application No. FR 0906005, filed on Dec. 11, 2009, the disclosure of which is incorporated by reference in its entirety.

FIELD OF THE INVENTION

The field of the invention relates to the monitoring of the alerts of aircraft avionics systems.

BACKGROUND

Avionics systems generally comprise their own anomaly detection and alert generation means able to transmit the alerts to a system for centralized management of alerts (or "Flight Warning System" as it is known). Thus such a system for managing alerts is capable of alerting the crew, of apprising of the defects of the aircraft and of listing for the crew the procedures to be applied as responses to the alerts displayed by the system. A centralized system for managing alerts constitutes progress with respect to sub-system based alert reports which would not allow the crew to have an overall picture in the case of several alerts arising concomitantly. Furthermore, the system for centralized management of alerts comprises the means for dispatching the detected and processed alerts to a system for recording the flight data as well as to a maintenance system of the aircraft and for synchronizing the audio messages associated with the alerts. Avionics systems also host their own mechanism for detecting functional anomalies whose result is thereafter transmitted directly to the alerts management function. More generally, a distinction is made between the "Monitoring" part, that is to say that for overseeing functional anomalies, which is hosted mainly in the avionics systems and partially in the alerts management function and the "Consolidation" function hosted in the system for managing the alerts which, with a monitoring result, according to the flight conditions, associates an alert.

The main functions of the system for centralized management of alerts are the collecting of the data of the avionics systems, the detecting of alerts, the filtering of alerts and the announcing of alerts. The main difficulty is the detecting of alerts which assumes a good knowledge of the state of the systems and which consists in detecting functional anomalies made by the system for centralized management of alerts and avionics systems monitoring functions.

Currently, the problem is solved by the avionics systems and the centralized management system and the technical solution to the problem is based on the processing of the input streams (collecting of the data of the avionics systems) via logic of Boolean type: AND, OR, NOR, NOT, delay, confirmation, step, etc. As represented by FIG. 1, the solutions used for the management of alerts comprises a system for centralized management of alerts (FWS) able to recover various items of information. This information provided to the FWS system may be simple data and alerts generated directly by the external systems. When the avionics systems host their own function for detecting functional anomalies, the alert associated with the anomaly is thereafter transmitted directly to the FWS system. The alerts are taken into account by a module for managing alerts and the FWS system can display to the crew the alerts as well as the associated procedures for resolving the problem related to the alert. When the information is simple data, the module for managing the alerts performs an interpretation of the data received so as to determine whether it is necessary to generate an alert. To this end, the alerts management module implements an alerts detection function.

Aircraft consisting, as they do, of complex systems, the FWS system must be capable of processing a multitude of alerts and information. The problem with the current solutions originates from the fact that the avionics systems and the centralized management function do not know the topology and the interactions between the avionics systems since the configurations of the systems are implicitly included in the logic for detecting the alerts. This logic may turn out to be erroneous notably within the framework of multiple faults or within the framework of systems reconfiguration. Furthermore, the cases of multiple faults can lead to multiple alerts which impact strongly on the burden of the flight personnel. Because the logic used is static and monofault, that is to say with a given fault is associated an alert, the associated algorithms lack robustness to aspects of automatic reconfiguration or of selective passivation or to multiple faults. The expression "selective passivation" is understood to mean the fact that a part of the network of items of equipment is no longer used.

SUMMARY OF THE INVENTION

The present invention proposes a device for formulating alerts making it possible to detect the appropriate alerts in the case of reconfiguration of an avionics system and, in a situation of multiple faults, to display the relevant alert or alerts from among the flow of alerts possibly triggered in cascade subsequent to a fault with a first item of equipment of a system.

More precisely, the invention relates to a device for formulating alerts of the items of equipment of an aircraft communicating by means of a communication network and each being able to carry out a functional application of the aircraft. The device comprises a database of virtual objects representing the items of equipment and the components of the communication network for constructing a virtual model representative on the one hand of the topological configuration of the network of items of equipment and on the other hand of the configuration of the chain of functional applications implemented by the items of equipment, means for each virtual object to formulate a request for consulting the status of the functional application carried out by the item of equipment associated with the object and the status of the item of equipment so as to modify the status of the object as a function of the information received, means for detecting alerts for formulating requests for consulting the status of each of the objects of the virtual model and for receiving the information of the status of the topology and functional configuration of the virtual objects in response to the consultation requests so as to detect anomalies of configuration of the topology of the network of items of equipment and of the chain of functional applications of the virtual model and to transmit the alerts associated with the anomalies.

Advantageously, a status consultation request for an object is of unique format for the set of objects of the model.

Advantageously, a virtual object comprises a plurality of items of information representing the status of the item of equipment associated with the object and the status of the functional application carried out by the item of equipment.

Advantageously, the status consultation requests consult the topological configuration of the virtual model.

Advantageously, the status consultation requests consult the configuration of the chain of functional applications of the virtual model.

According to any one of the previous variants, it furthermore comprises means for activating and deactivating the alerts arising from the objects of the virtual model.

The virtual model of a system is a real-time representation of the topological and functional configuration of the items of equipment of the system. The use of a virtual model is advantageous because the virtual objects representing the items of equipment of the system comprise status information relating to the functional and structural behaviour within the communication network. Thus, the model takes account of any reconfigurations, automatic or otherwise, such as selective passivation. It is an evolving model representing the status of the system in real time. Moreover, the model is valid irrespective of the items of equipment and the system to which they belong and is also independent of the alert detection logic. Indeed, the model is updated continually and then analysed to deduce therefrom the states associated with alerts.

The model is applicable to an item of equipment, to a sub-group of items of equipment making up a system or to all the items of equipment and systems and can therefore accommodate centralized or distributed architectures. A model is created on the basis of the configuration files specific to the real system and to its definition and which is enriched with all the events which impact the architecture: Downloading of software, of configuration tables and of data arising from the onboard databases, changing and loading of new elements in the system, faults with items of equipment of the system, reconfiguration of a system, selective passivation. More generally, the model evolves as a function of any event which gives rise to a modification of the topological configuration of the communication network between the items of equipment and systems and a modification of the functional configuration of the items of equipment.

BRIEF DESCRIPTION OF THE DRAWINGS

The invention will be better understood and other advantages will become apparent on reading the nonlimiting description which follows and by virtue of the appended figures among which.

DETAILED DESCRIPTION

Figure 1:
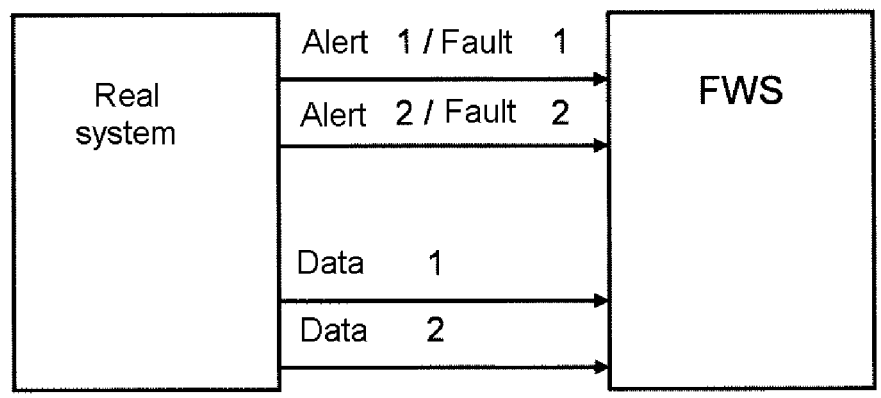
FIG. 1 represents a simplified diagram of a functional architecture of a solution for managing the alerts in an aircraft according to the prior art.

FIG. 1 represents a simplified diagram of a functional architecture of a solution for managing the alerts in an aircraft according to the prior art. The alerts and the state information for the set of systems are managed in a centralized way by the FWS system function kernel. The FWS function thereafter manages the state information and the alerts received so as to display them and optionally associate them with operational procedures and tasks with the aim of informing the crew of the failure detected and of displaying for them the tasks to be carried out as a function of this failure. Furthermore, the FWS system comprises databases of procedures to be carried out and the FWS kernel consists of computation means for implementing the Boolean logic making it possible to associate with each alert or item of status information a message or a procedure to be displayed in one or more of the aircraft's cockpit viewing devices. However, this mode of operation shows its limits for the complex systems where, when several alerts are triggered by the systems notably through a cascade effect between the systems, the Boolean logic does not make it possible to effectively synthesize the stream of information so as to help the crew to take the right decisions.

Figure 2:
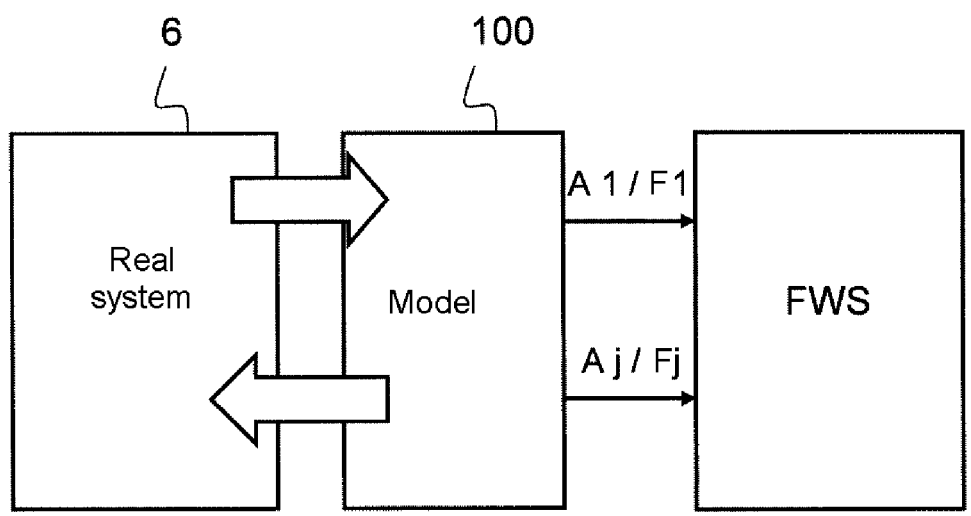
FIG. 2 represents a simplified diagram of the functional architecture of the solution for managing the alerts in an aircraft according to the invention.

For this purpose, as illustrated in FIG. 2, the invention proposes a device for formulating alerts 100 originating from one or more systems 6 of an aircraft for monitoring the alerts of the systems of a civilian or military aircraft which fulfil for example the various functions necessary for accomplishing a flight. An avionics system 6 usually comprises several communicating items of equipment arranged in a communication network (or ADCN for "Airborne Data Communication Network" as it is known). These items of equipment and other systems of the aircraft communicate with one another and with the environment through a physical network according to a data format of ARINC 429 type. This communication standard is the one most commonly used for communication between complex aircraft systems, however the invention is not limited to this type of communication standard. The device for formulating the alerts according to the subject matter claimed makes it possible to provide the FWS system with data of alerts taking into account the topology of the communication network between the items of equipment and systems as well as the functional behaviour of each of them and the whole of the functional chain effected by the items of equipment.

The model or models 2 formulated by the device according to the invention represent the systems by:

a physical level: the hardware items of equipment, the connectors, the cables.

a logical level or functional application level: the applications, the OS ("operating software"), the data messages, the paths of data of the multiplexed buses for example.

a functional level representing the whole of the functional application chain: the "position computation" aircraft functions and the functional streams such as the "speed" and "position" data for example. To each of these levels is allotted a status in a virtual object of the virtual model 2.

An alert logic is a Boolean logic regarding the statuses of the functions and functional chains (succession of functions and of functional stream). These functions and functional streams are allocated on the logical level (a position computation function is associated with three software applications for example), itself allocated on the physical level (a first application on a first item of equipment, a second application on a second item of equipment, etc.).

During the operation of the systems, events intrinsic to the system 6 as well as events specific to the environment of use of the system will modify the configuration of the items of equipment of the system 6. For example, upon a failure of a computer of an item of equipment initially implementing a given application, this item of equipment may be deactivated and the execution of the application in question may be reoriented on another computer. This example pertains to a case of reconfiguration of the systems that may be automatic or manual. Configuration files specific to the real system are enriched with all the elements having repercussions on the configuration of the systems. These events may be for example the downloading and updating of software, of configuration tables, of databases, the changing and loading of new items of equipment in the system, faults with items of equipment of the system, the reconfiguration of the system and the selective passivation of an item of equipment. The model contains the topology of the network of the items of equipment of the real system and the propagation relations for the failures. For example, an alert is triggered when the automatic pilot does not receive the aerodynamic speed. The algorithm for detecting the alerts considers that everything is valid when the functional chain: "computation of the speed", "transport of the speed", "processing of the speed", is good. These functions are allocated on a computation application, on a logic communication network and on a processing application. In the model, this computation application is allocated to an item of equipment, the communication network to an Ethernet-type multiplexed network with a succession of switches, and two automatic piloting computers. In this configuration, the algorithm takes into account the state of all these objects, arising from the state of the real components of the system, including those of the switches. If the Ethernet network is no longer operating and the data are transmitted by a network of A429 type via a "dataconcentration" function which communicates via an A429 communication bus to the computers of the automatic piloting. The algorithm does not change but the allocation of the functional application on the physical communication item of equipment changes. The algorithm henceforth takes into account the state of the A429 communication buses and of the "dataconcentration" in order to formulate the alert.

The objects of the model transmit their failure detection result in response to queries originating from the detection algorithm (communication lost, data not received, "failed", etc.), the normal states and others which are perceived as a failure ("OFF", "in test", "in dataloading", "crew action", etc.), the environmental conditions which may influence its behaviour (temperature too high, MEU/SBU ("Multiple Event Upset", "Single Bit Upset"), icing, speed too high, etc.) or their state of healthiness, etc.

Figure 3:
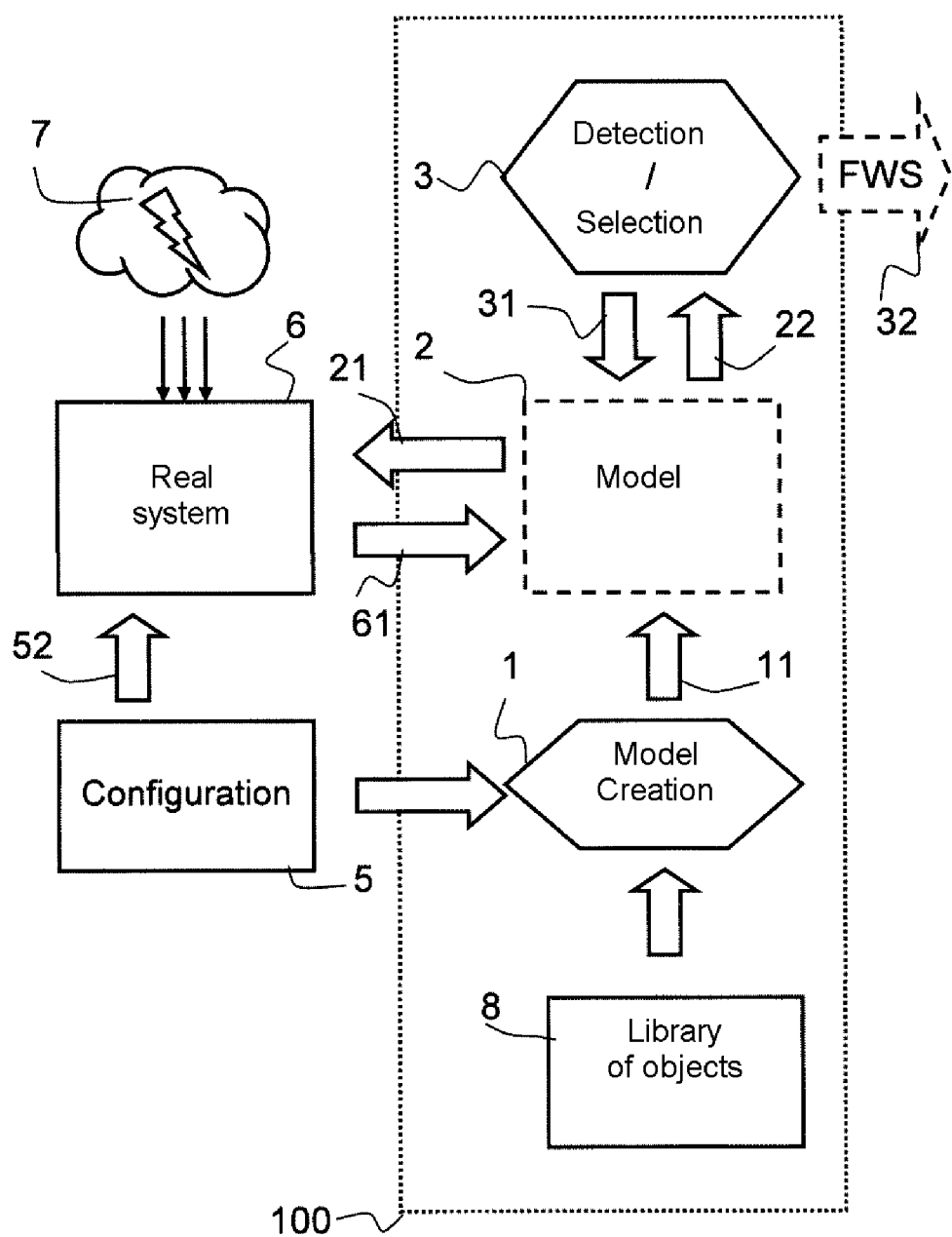
FIG. 3 illustrates the functions of the claimed device for formulating alerts.

FIG. 3 illustrates the operation of the claimed device for formulating alerts. A real system 6 comprises a plurality of communicating items of equipment connected together by a communication network. These items of equipment carry out functions necessary for the conduct of the mission of the system 6 and evolves in the course of the operation thereof. The modification and evolution events 7 impacting the topological and functional configuration of the system 6 are recorded in configuration files 5. In response to these events, the configuration files provide the configuration orders 52 to the items of equipment and the communication network of the real system 6.

The device 100 for formulating the alerts of the system of items of equipment 6 comprises a means for simulating a virtual model 2 of the system of items of equipment 6. This model reproduces the architecture of the real system 6 and consists of virtual objects representing the items of equipment, the functional applications carried out by its items of equipment and the communication elements of the real system 6. The model represents the topology of the system as well as the interactions between the items of equipment of the system. This model is constructed and updated on the basis of the real data (including for example the configuration files 5) of the equipment network and of the items of equipment themselves in real time. This model is hosted by one or more computers and is, either distributed between the systems and the FWS system, or centralized (for example within the FWS system or in an independent computer dedicated to the simulation of a model). This server may be accessed by one or more systems searching for one and the same model or several different models.

The model 2 is initially constructed by a model creation function 1 using a database 8 constituting a library of virtual objects. The model is supported by an architecture constructed on an object programming base. Each of the objects represents a behaviour of an item of equipment (switch, linkup, port, connector, etc.). On the basis of the configuration files 5 representing the configuration of the real system and the library of virtual objects, the function 1 for creating the model establishes a virtual model 6 representing the topology of the system as well as the interactions between the items of equipment. Each event having an impact on the real system 6 is recorded in the configuration files also serving to construct the virtual model. Thus, the model is updated in real time and represents the current behaviour of the system.

The device according to the invention also comprises means 61 making it possible to transmit information directly in real time between the items of equipment and the model 2 thus making it possible to keep the model updated and to transmit responses 61 subsequent to interrogations 21 originating from the model if an object of the model queried by the algorithm for detecting the alerts does not contain the requested information. For each object, the way of responding to the query 31 is different. In a first example, an object corresponding to a real item of equipment with a processing and communication capability will for example contact it and ask it to run a test and to communicate the result. Another object associated with a real cable will query the destination items of equipment for example so as to ask whether they are indeed receiving the expected data. In a second example, when an item of equipment has failed and the application is carried over to a second item of equipment, the information is transmitted to the virtual model which updates itself automatically by moving the object associated with the application. The various alerts logic elements at the functional level are allocated on the applications at the logical level, themselves allocated on items of equipment at the physical level. This alert logic is preserved, the model itself has evolved (allocation of the logical on the physical), the result therefore takes this reconfiguration into account.

The detection of the alerts is carried out by a computation means 3 utilizing the model 2 by associating alerts with states of the model. Thus states of the model may be used to detect the cases of triggering of alerts in cascade and of multiple alert so as to deduce the most appropriate alerts to be transmitted to the flight personnel. For this purpose, the virtual objects of the model possess an interface with the detection algorithm allowing the computation means 3 implementing the detection algorithm to transmit status consultation requests 31 to each of the objects of the model. These objects dispatch responses 22 to the alert detection computation means 3. The alert algorithm provides the state of the chain of functional applications considered in the system considered and thus can deduce therefrom the appropriate alert to be transmitted to the pilot. Other information can arise from the analysis: any status of each item of equipment, failed link of the chain.

To filter the false alerts, the model is updated as a function of the evolutions of the real system. If a computer has the turned-off status ("OFF"), this status is indicated in the status of the associated object. When traversing the model, the algorithm is concerned only with the objects which are associated with the function considered and processes both their noted state and the visibility of their state. More precisely, if the status of a real item of equipment is valid but the path between the model and the item of equipment is cut off by another faulty item of equipment, the model treats it as "non-visible", if the path is good, the model treats it as "good". According to the states of the model, the algorithm generates alerts 32 which are thereafter transmitted to a device for managing alerts allowing the presentation of the alerts to the crew with the desired information, such as for example the procedures and tasks to be carried out in order to deal with the fault.

The invention applies to the systems for centralized management of alerts originating from the items of equipment of an aircraft and particularly to the function for detecting alerts.

The invention claimed is:

1. A system for centralized management of alerts and resolution procedures for an aircraft comprising:
   a device for formulating alerts of items of equipment of the aircraft communicating by means of a communication network and each of the items of equipment being able to carry out a functional application of the aircraft, the device further comprising:
      a database of virtual objects representing the items of equipment and components of the communication network for constructing a virtual model representative of a topological configuration of the network of items of equipment and of a configuration of a chain of functional applications implemented by the items of equipment,
      means for each virtual object to formulate a request for consulting a status of the functional application of the aircraft carried out by the items of equipment associated with the object and the status of the item of equipment so as to modify the status of the virtual object as a function of information received, and
      means for detecting alerts for formulating requests for consulting a status of each of the objects of the virtual model and for receiving information of the status of the topology and functional configuration of the virtual objects in response to the consultation requests so as to detect anomalies of configuration of the topology of the network of items of equipment and of the chain of functional applications of the virtual model and to transmit the detected alerts associated with the detected anomalies,
   wherein the system for managing the detected alerts presents the detected alerts and displays operational procedures and tasks.

2. The system according to claim 1, wherein a status consultation request for one of the virtual objects is of a unique format for a set of objects of the virtual model.

3. The system according to claim 1, wherein the virtual object comprises a plurality of items of information representing the status of the item of equipment associated with the virtual object and the status of the functional application carried out by the item of equipment.

4. The system according to claim 1, wherein the status consultation requests consult the topological configuration of the virtual model.

5. The system according to claim 1, wherein the status consultation requests consult the configuration of the chain of functional applications of the virtual model.

6. The system according to claim 1, further comprising means for activating and deactivating the alerts arising from the virtual objects of the virtual model.

* * * * *